US012560215B2

(12) United States Patent   (10) Patent No.:  US 12,560,215 B2
Lund et al.   (45) Date of Patent:  Feb. 24, 2026

---

(54) VISCOELASTIC DAMPER ASSEMBLY

(71) Applicant: Momentum Technologies AS, Trondheim (NO)

(72) Inventors: Even Lund, Skatval (NO); Haavard Björköy Johnsen, Ranheim (NO); Lina Ödlund, Malvik (NO)

(73) Assignee: Momentum Technologies AS, Trondheim (NO)

( * ) Notice: Subject to any disclaimer, the term of this patent is extended or adjusted under 35 U.S.C. 154(b) by 379 days.

(21) Appl. No.: 18/253,827

(22) PCT Filed: Dec. 2, 2021

(86) PCT No.: PCT/NO2021/050248
§ 371 (c)(1),
(2) Date: May 22, 2023

(87) PCT Pub. No.: WO2022/119449
PCT Pub. Date: Jun. 9, 2022

(65) Prior Publication Data
US 2024/0102529 A1    Mar. 28, 2024

(30) Foreign Application Priority Data
Dec. 3, 2020    (NO) ................................... 20201329

(51) Int. Cl.
*F16F 9/06*          (2006.01)
*F16F 9/00*          (2006.01)
*F16F 9/30*          (2006.01)

(52) U.S. Cl.
CPC ................ *F16F 9/30* (2013.01); *F16F 9/006* (2013.01); *F16F 2222/12* (2013.01); *F16F 2224/048* (2013.01); *F16F 2230/30* (2013.01); *F16F 2230/36* (2013.01)

(58) Field of Classification Search
CPC ...... F16F 9/30; F16F 9/006; F16F 9/06; F16F 9/061; F16F 9/062; F16F 9/068; F16F 2222/12; F16F 2224/048; F16F 2230/30; F16F 2230/36
USPC ......................................................... 188/269
See application file for complete search history.

(56) References Cited

U.S. PATENT DOCUMENTS

| | | | |
|---|---|---|---|
| 3,853,311 A | * | 12/1974 | Kreuzer .................. B60R 19/32 |
| | | | 267/116 |
| 4,648,577 A | | 3/1987 | Weber |
| 5,277,281 A | * | 1/1994 | Carlson .................... H01F 1/447 |
| | | | 188/320 |
| 5,284,330 A | * | 2/1994 | Carlson .................. H01F 1/447 |
| | | | 188/267.2 |

(Continued)

FOREIGN PATENT DOCUMENTS

| | | |
|---|---|---|
| CH | 277098 A | 8/1951 |
| CN | 203239827 U | 10/2013 |

(Continued)

OTHER PUBLICATIONS

International Search Report and Written Opinion mailed Feb. 24, 2022 for International Patent Application No. PCT/NO2021/050248.

*Primary Examiner* — Thomas W Irvin
(74) *Attorney, Agent, or Firm* — Alix, Yale & Ristas, LLP

(57) ABSTRACT

Viscoelastic damper assembly applicable both in air and submerged applications and with improved efficiency over prior art solutions for adding damping to an object or structure.

19 Claims, 10 Drawing Sheets

(56)                    References Cited

U.S. PATENT DOCUMENTS

| | | | | |
|---|---|---|---|---|
| 5,595,374 A * | 1/1997 | Charette | ................. | F16F 13/20 |
| | | | | 267/140.14 |
| 8,714,321 B2 * | 5/2014 | Powell | ................. | B60G 15/062 |
| | | | | 188/314 |
| 10,422,442 B2 | 9/2019 | Norris et al. | | |
| 2005/0074296 A1 | 4/2005 | McCarty et al. | | |
| 2008/0284073 A1 * | 11/2008 | Heleski | ..................... | F16F 9/48 |
| | | | | 267/124 |
| 2010/0215440 A1 | 8/2010 | Wajnikonis | | |
| 2012/0306133 A1 * | 12/2012 | Powell | ..................... | F16F 9/22 |
| | | | | 188/269 |
| 2019/0136932 A1 * | 5/2019 | Deferme | ................. | F16F 9/46 |
| 2019/0195306 A1 | 6/2019 | Mobeck | | |
| 2020/0208704 A1 * | 7/2020 | Deferme | ................. | F16F 9/325 |

FOREIGN PATENT DOCUMENTS

| | | | |
|---|---|---|---|
| CN | 205606073 U | 9/2016 |
| CN | 209876153 U | 12/2019 |
| DE | 3214687 A1 | 10/1983 |
| DE | 8134058 U1 | 8/1984 |
| DE | 227763 A1 | 9/1985 |
| DE | 4204128 A1 | 8/1993 |
| DE | 102006059528 A1 | 6/2008 |
| EP | 0124472 B1 | 6/1989 |
| FR | 2516629 A1 | 5/1983 |
| JP | 57127141 A | 8/1982 |
| JP | 6065930 A | 4/1985 |
| RU | 2686957 C1 | 5/2019 |

* cited by examiner

171

VISCOELASTIC DAMPER ASSEMBLY

BACKGROUND

The disclosed embodiments relate to a viscoelastic damper assembly.

Viscous or viscoelastic dampers are well known to be used in different applications in air/atmosphere. The principle of viscous dampers is based on that a vibrating object, e.g. a pipe or pipeline, is connected to a stationary/fixed fundament or base via the viscous damper. The damper comprises a bottom connection plate to which is arranged a housing that is filled with a viscous fluid (high internal resistance to flow). The damper further comprises a top connection plate to which is arranged one or more rods or tubes extending into the viscous fluid in the housing and connected to a connection plate. The rod or tube that is connected to the top connection plate can move in all directions within the housing. The connection plates are used to attach the damper to the structure to be damped and a fundament.

The viscoelastic damper dissipates the vibration in the object or the structure it is connected to, by converting most of the energy into heat.

In US 2019195306 A1 is described a subsea damper unit, comprising a cylinder body equipped with an internal damper chamber filled with damper oil. Said damper chamber contains a through-running piston rod with a piston that divides the damper chamber into two chamber parts, and wherein the piston is equipped with one or more valves that permit fluid communication between said chamber parts. The subsea damper unit further comprises a housing equipped with openings allowing ingress of the surrounding seawater.

From WO 2015017792 A1 it is known viscoelastic pipeline vibration dampers (PVDs) for air and subsea use, respectively, provided in a cylindrical housing, where subsea embodiments are arranged within a pressure vessel to avoid fluid-structure interaction between the PVD and the seawater.

In US 2010215440 A1 is disclosed three-dimensional damper arrangements of different designs for buoyancy or catenary lines, wherein said arrangements are designed to enhance hydraulic drag.

The prior art solutions are however not designed to work under water, i.e. submerged, due to that it, for submerged applications, cannot be air present in the damper.

A further disadvantage with the prior art solutions is that they are not easily tuneable/adjustable to achieve selectable damping properties in the different degrees of freedom.

The prior art solutions further suffer from low drag coefficient, resulting in that they require large assemblies with large volumes of high viscosity fluids, which is space demanding and expensive.

A further disadvantage with the prior art solutions is that the use of large assemblies with a high amount of viscous fluid, due to the low drag coefficient, will make them less stable than preferred at varying temperature.

Another disadvantage with the prior art solutions is that they are designed to be stand-alone assemblies that are not arranged to cooperate with other damper assemblies.

As the prior art solutions are not adapted for arrangement in submerged applications they are neither adapted for handling penetration of impurities, fouling, marine growth and seawater.

SUMMARY

Provided herein is a viscoelastic damper assembly partly or entirely solving the drawbacks of the prior art solutions.

The disclosed viscoelastic damper assembly exhibits a higher drag coefficient than the prior art solutions.

The disclosed viscoelastic damper assembly is less space-demanding than prior art solutions.

The disclosed viscoelastic damper assembly also requires less volume of viscoelastic fluid compared to prior art solutions.

The disclosed viscoelastic damper assembly also enables stability over a larger temperature range than prior art solutions.

The disclosed viscoelastic damper assembly also enables tuning or adjustment of the damping coefficient in all degrees of freedom.

The disclosed viscoelastic damper assembly is designed for submerged applications and applications in air.

The disclosed viscoelastic damper assembly enables sub-assemblies with other viscoelastic damper assemblies in parallel or series.

The disclosed viscoelastic damper assembly may be used as a component in other damper systems.

The disclosed viscoelastic damper assembly is robust against penetration of impurities, fouling, marine growth and seawater.

Disclosed herein is a viscoelastic damper assembly for adding damping to an object or structure by arrangement between the object or structure and a stationary object or structure.

A viscoelastic damper assembly according to the disclosure comprises a housing provided with an opening at a first end thereof and provided with a connection device at a second closed end thereof. The viscoelastic damper assembly further comprises at least one damping unit arranged to a connection device at a first end and with a second end extending into the housing via the opening.

The connection devices of the housing and damping unit are used to arrange the viscoelastic damper assembly to a stationary object or structure at one side and to an object or structure to be damped at the other side, depending on the orientation of the viscoelastic damper assembly.

The viscoelastic damper assembly according to the disclosure further comprises resilient sealing means providing an airtight and watertight sealing between the at least one damping unit and the housing, wherein a viscous fluid is accommodated in the housing.

As disclosed, the housing is partly filled with the viscous fluid and partly filled with an immiscible filling fluid, i.e. non-compatible with the viscous fluid, wherein the at least one damping unit extends at least partly into the viscous fluid.

According to one embodiment the housing is arranged with the opening downwards and wherein the immiscible filling fluid has higher density and lower viscosity than the viscous fluid.

Due to the viscous fluid having lower density than the immiscible filling fluid, this will result in that the viscous fluid will be positioned towards the second closed end of the housing and the immiscible filling fluid towards the first end of the housing with the opening, thus forming two layers of fluids in the housing.

In an alternative embodiment, the housing is arranged with the opening upwards and wherein the immiscible filling fluid has lower density and lower viscosity than the viscous fluid. In this embodiment, one will achieve an opposite effect of the viscous fluid and immiscible filling fluid than in the prior embodiment.

The viscoelastic damper assembly further comprises means for compensation of interior volume, i.e. pressure balancing/equalization.

According to an embodiment, the at least one damping unit is formed by an elongated body and at least one damping device. The elongated body and at least one damping device may be detachably arranged to each other or manufactured as one unit. Preferably, the at least one damping device at least partly extends into the viscous fluid.

According to one embodiment, the compensation means are provided by that the elongated body is hollow and further provided with ventilation holes, wherein at least one ventilation hole is arranged in the part of the elongated body positioned inside the housing and at least one ventilation hole arranged in the part of the elongated body positioned outside the housing, and wherein at least one accumulator is connected to the ventilation hole positioned outside the housing.

In an alternative embodiment, the ventilation holes are open to surrounding fluid.

In accordance with one embodiment the at least one damping device comprises at least one damping member.

In an embodiment, the at least one damping member is oriented in the viscous fluid to set individual damping properties for different degrees of freedom.

According to a further embodiment, the at least one damping device comprises at least two damping members, having similar or different shape and/or size, arranged to each other or to a base structure.

In accordance with a further embodiment, the at least two damping members are aligned horizontally or vertically.

According to a further embodiment, geometries of the at least two damping members are repeated in a rotational or translational manner.

In accordance with one embodiment, the at least one damping member is a plate-shaped structure.

In a further embodiment, the viscoelastic damper assembly comprises at least two damping devices arranged in parallel or series in the same housing.

In accordance with a further embodiment, two or more separate viscoelastic damper assemblies are arranged in series or parallel.

The disclosed viscoelastic damper assembly may be used for both applications in air and submerged applications.

The viscoelastic damper assembly may further be designed and tailored for the actual application by enabling the possibility to set individual damping properties for different degrees of freedom.

An advantage with the disclosed embodiments is that the viscoelastic damper assembly may be arranged upside down due to the viscous fluid have lower density than the immiscible filling fluid.

The viscoelastic damper assembly may also be used as a component in other damper systems, such as well known tuned mass damper systems and hydro hook support vibration dampers, as e.g. described in WO2018186746.

BRIEF DESCRIPTION OF THE DRAWINGS

The present invention will below be described with reference to the attached drawings, where.

DETAILED DESCRIPTION

Figure 1A:
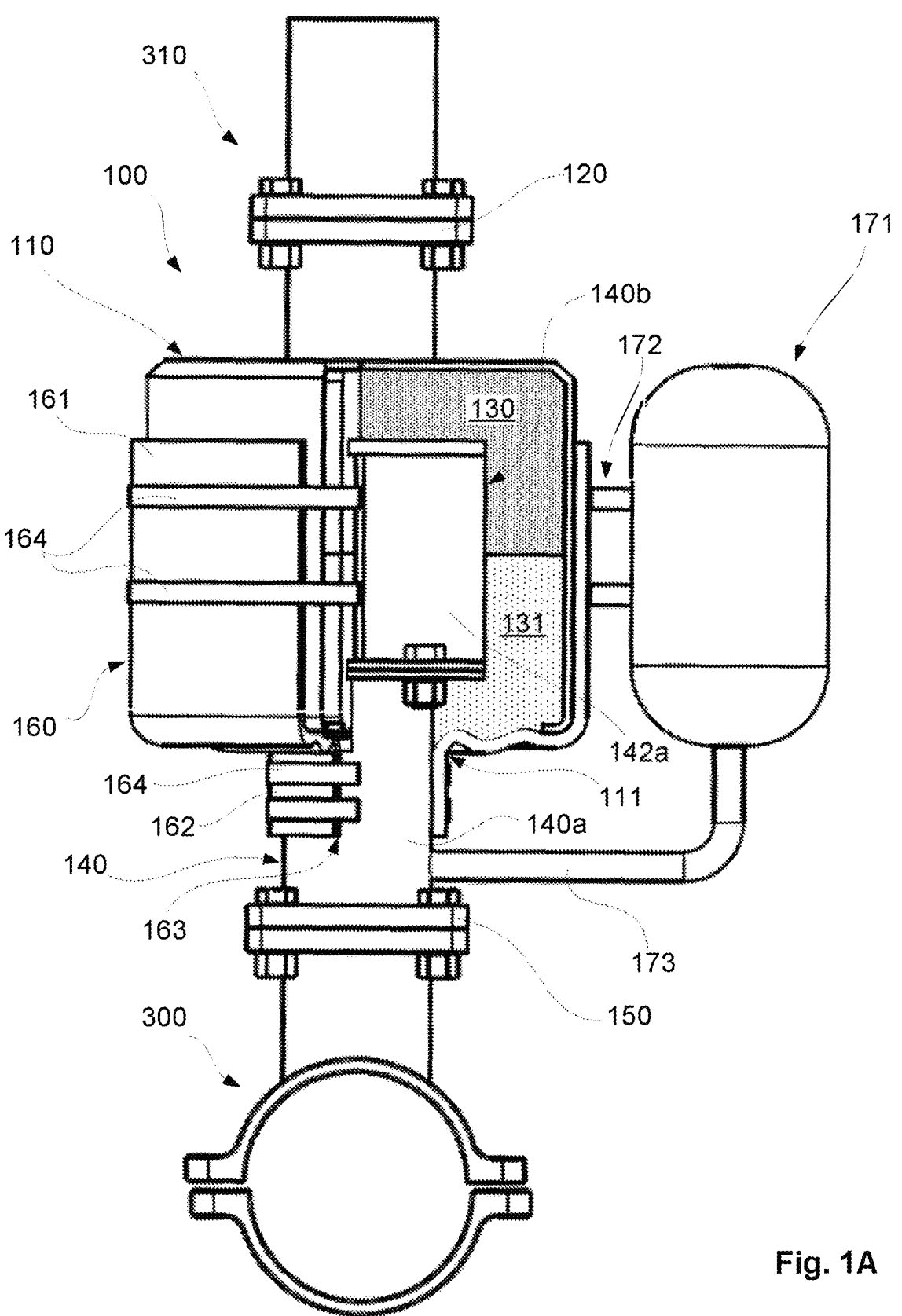
FIGS. 1A-1D are principle drawings of an embodiment of the disclosed viscoelastic damper assembly.
Figure 1B:
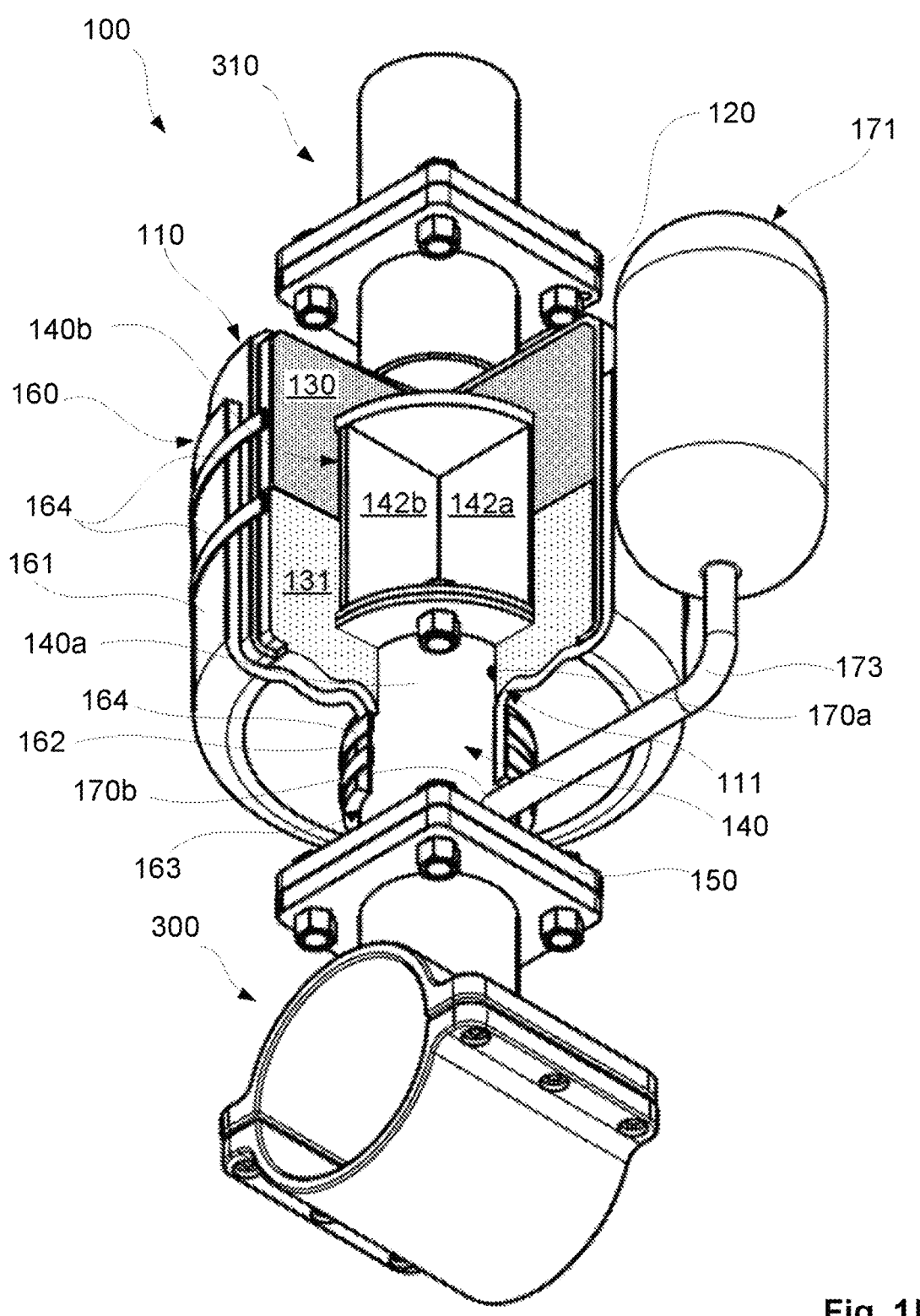

Reference is now made to FIGS. 1A-1D showing principle drawings of an embodiment of the disclosed viscoelastic damper assembly 100. The viscoelastic damper assembly 100 comprises a housing 110 provided with an opening 111 at a first end and closed at a second end. The housing 110 is at the second end, i.e. the closed end, provided with a connection device 120, such as a connection plate, further described below.

The housing 110 is partly filled with a viscous fluid 130 and partly filled with an immiscible filling fluid 131 with low viscosity, wherein the viscous fluid 130 provides a damping medium in the viscoelastic damper 100. In the shown embodiment, the immiscible filling fluid 131 is a fluid having higher density than the viscous fluid 130. In the examples are shown a filling in the housing 110 of the viscous fluid 130 of approximately 50% and a filling of immiscible filling fluid of approximately 50%, but the amount of the respective fluid may be adjusted according to the desired properties of the viscoelastic damper assembly 100. The viscous fluid 130 is a viscous fluid with preferred damping properties. Examples of viscous fluids that may be used are, but not limited to, silicone oil based fluids and tar. Other fluids with these properties will be within the knowledge of a skilled person. In the shown embodiment the immiscible filling fluid 131 is a fluid with low viscosity, such as, but not limited to, water, a thin silicone oil or similar. Other fluids with these properties will be within the knowledge of a skilled person. Accordingly, when the viscoelastic damper assembly 100 is arranged with the second closed end of the housing 100 upwards, i.e. the housing 110 is arranged upside down, the viscous fluid 130 (damping medium) will be positioned towards the closed end of the housing 110, while the filing fluid 131 (low viscosity fluid) will be positioned at the part of the housing 110 with the opening 111, due to that the viscous fluid 130 (damping medium) has lower density than the immiscible filling fluid 131 and will thus float upwards in the housing 110. The immiscible filling fluid 131 further ensures that there is no air in the viscoelastic damper assembly 100. The immiscible filling fluid 131, due to the low viscosity, does not add damping to the viscoelastic damper assembly 100. Further, the viscous fluid 130 and immiscible filling fluid 131 are non-compatible fluids such that they will not mix with one another.

The viscoelastic damper assembly 100 further comprises at least one damping unit 140 having a first and a second end, extending into the viscous fluid 130 (damping medium) in the housing 110 via the opening 111. At the first end of the at least one damping unit 140 is arranged a connection device 150, such as a connection plate, further described below.

The viscoelastic damper assembly 100 further comprises sealing means 160, providing a sealing between the at least one damping unit 140 and the housing 110. The sealing means 160 are preferably both airtight and watertight. The sealing means 160 will thus retain the viscous fluid 130 and immiscible filling fluid 131 in the housing 110, as well as preventing any fluid or air to enter/penetrate from the outside thereof. The sealing means 160 is further preferably of an elastic/resilient (high strength) material, such as, but not limited to, rubber, Teflon, textile, plastic or similar. Due to the sealing means 160 is of an elastic/resilient material this allows movement of the at least one damping unit 140 in all directions, as well as expansion or retraction of the viscous fluid 130 and immiscible filling fluid 131 due to temperature changes. The sealing means 160 is, e.g., formed by a mainly U-shaped sealing member 161, but may have other shapes, with an opening adapted the shape and size of the housing 110, arranged to the housing 110 at the side with the opening 111, which sealing member 161, when arranged to the housing 110, extends a distance in height direction of the housing 110.

The sealing member 161 is further at the opposite side of the opening provided with at least one flange 162 ending in a damping unit opening 163 adapted for receiving and accommodating the damping unit 140. The flange 162 preferably has an extension along the damping unit 140 such that it may be fixed to the damping unit 140 exterior of the housing 110.

The sealing between the housing 110 and the sealing member 161, as well as the between the damping unit 140 and the flange 162, is achieved by the inherent elastic/resilient properties of the sealing member 161, as well as by using clamping rings 164 applying pressure on the exterior surface of the flange 162 and U-shaped sealing member 161 against the damping unit 140 and housing 110, respectively.

In this manner, a secure and safe airtight and watertight sealing is achieved and thus preventing penetration of impurities, marine growth and seawater, as well as the damping unit 140 is allowed to move in all directions.

The damping unit 140 is formed by two parts 140*a-b*, in the form of an elongated body 140*a*, such as rod or tube, arranged at a first end to the connection device 150 and a damping device 140*b* arranged to a second end of the elongated body 140*a* and extending into the viscous fluid 130 (damping medium). The two parts 140*a-b* of the damping unit 140 may be machined as one unit or may be formed by two separate parts that may be assembled and fixed together by means of attachment flanges 141 and attachment means, such as bolts. The damping device 140*b* will be provided with different damping properties depending on the application. In this way, the viscoelastic damper assembly 100 may use the same basic components, wherein the properties of the damping unit 140 may be altered to exhibit desired properties, which will be further described below. Details of the damping device 140*b* will be discussed below.

The viscoelastic damper assembly 100 is further provided with means 170*a-b*, 171 for compensation of the interior volume, i.e. pressure balancing/equalization. In the shown embodiment, the means for compensation are provided by that the elongated body 140*a* is hollow and further provided with ventilation holes 170*a-b*, wherein at least one ventilation hole 170*a* is arranged in the part of the elongated body 140*a* positioned inside the housing 110, i.e. in the part of the elongated body 140*a* that is inside the sealing means 160, and at least one ventilation hole 170*b* arranged in the part of the elongated body 140*a* positioned outside the housing 110/sealing means 160. The means for compensation further comprises at least one accumulator 171. The at least one accumulator 171 is arranged exterior of the housing 110 by means of attachment means 172, e.g. as shown in FIG. 1A, attached to the housing 100 by means of attachment to the clamping rings 164 used for attachment of the sealing means 160. The mentioned at least one accumulator 171 is connected to the ventilation hole 170*b* in the elongated body

140*a* arranged exterior of the sealing means 160/housing 110 by means of a tube, pipe or hose 173 extending from the lower end of the at least one accumulator 171 and to the ventilation hole 170*b*.

Figures 2A, 2B, 2C, 2D, 2E, 2F, 2G, 2H:
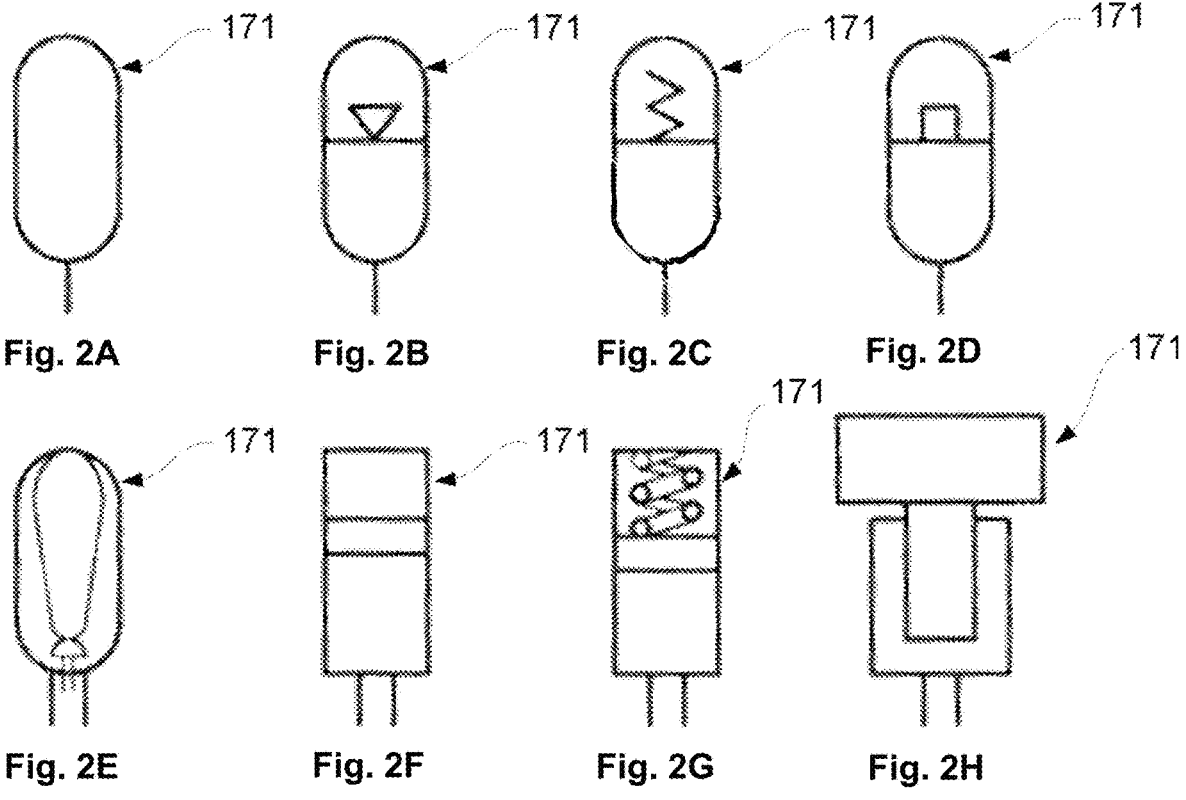
FIGS. 2A-2H are principle drawings of a accumulators according to prior art.

Reference is now made to FIGS. 2A-2H showing principle drawings of non-limited examples of different types of accumulators 171 that may be used in the inventive embodiments, wherein FIG. 2A is a no barrier accumulator, FIG. 2B is a gas charged accumulator, FIG. 2C is a spring-loaded accumulator, FIG. 2D is a weight-loaded accumulator, FIG. 2E is a gas-over-bladder accumulator, FIG. 2F is a gas-over-piston accumulator, FIG. 2G is a spring-over-piston accumulator and FIG. 2H is a weighted ram accumulator.

Accordingly, by means of the at least one accumulator 171 the interior volume of the viscoelastic damper assembly 100 may be equalized or compensated for by means of the at least one accumulator 171 by adding or removing immiscible filling fluid 131 to/from the housing 110.

By the choice of accumulator 171, as well as adjustment of the at least one accumulator 171, the viscoelastic damper assembly 100 may be tuned as regards compensation of the interior volume.

According to a further embodiment, the at least one accumulator 171 is arranged to a control unit (not shown), wherein the properties of the at least one accumulator 171 may be adjusted manually or automated.

Figure 1C:
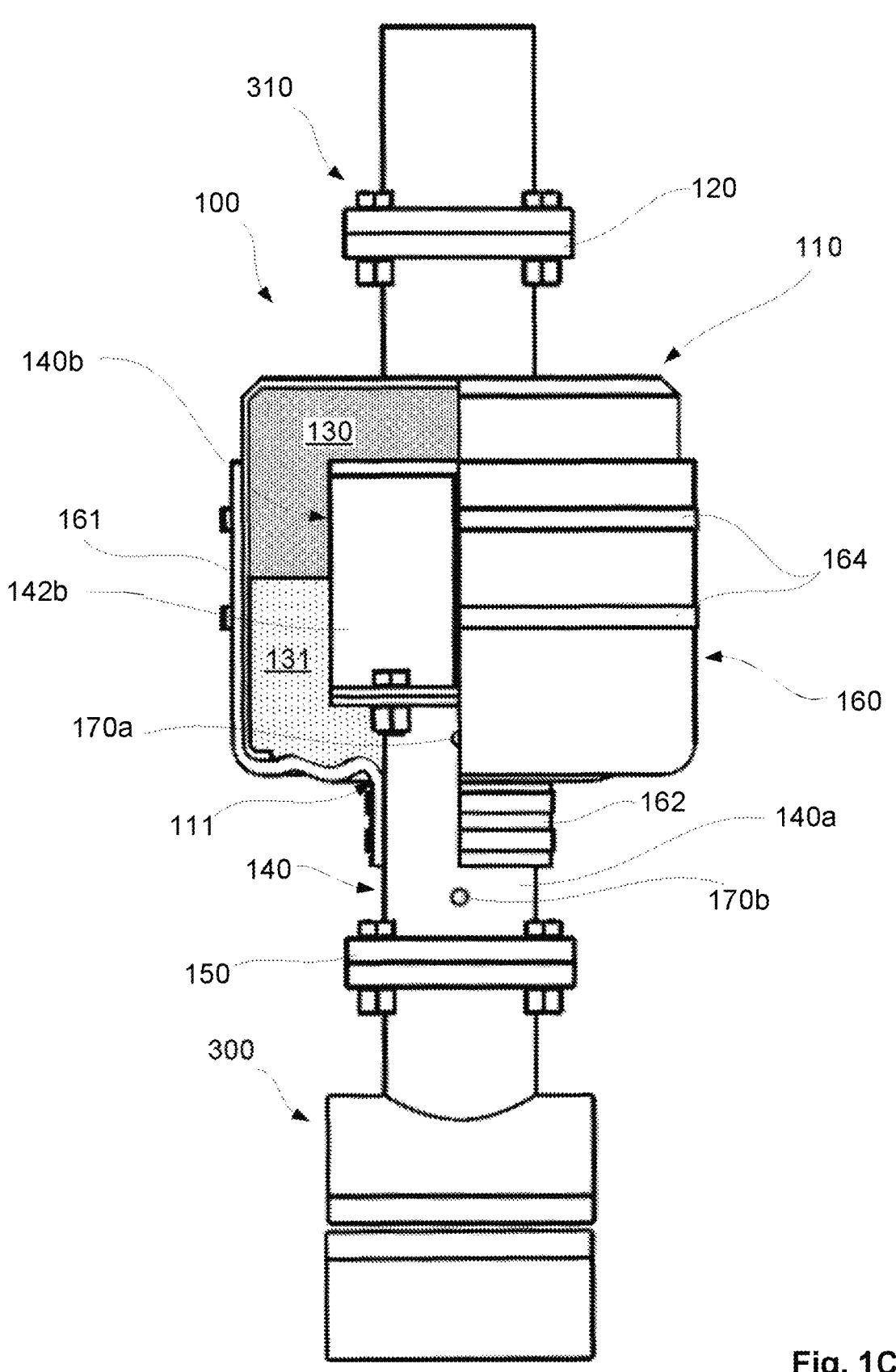
Figure 1D:
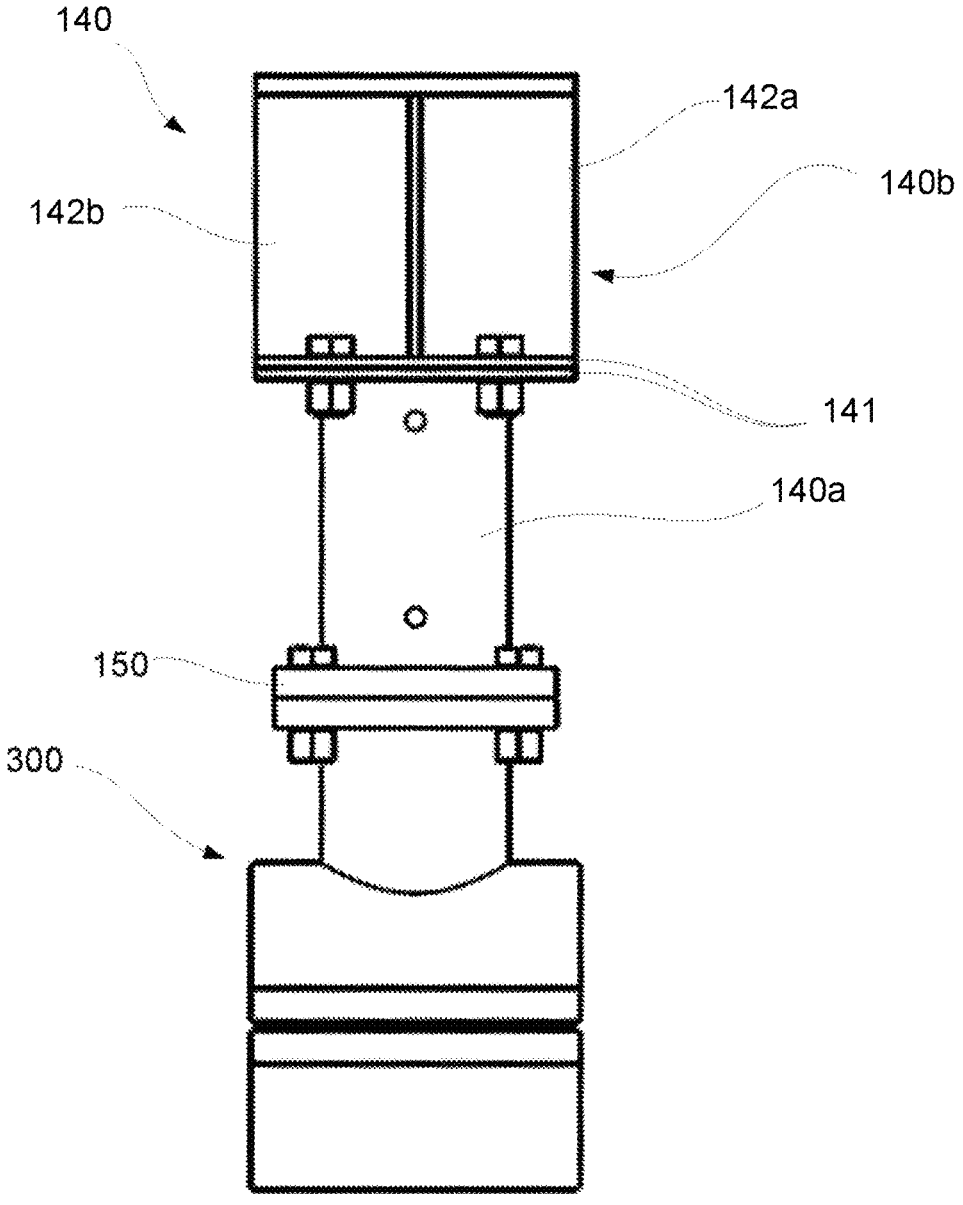

In an alternative embodiment, the viscoelastic damper assembly 100 is adapted for passive compensation of the interior volume by that the mentioned ventilation holes 170*a-b* are open to surrounding fluid, as shown in FIG. 1C, i.e. an embodiment without the at least one accumulator 171. Accordingly, if the viscoelastic damper assembly 100 is submerged in water, water will be allowed to flow freely in and out of the viscoelastic damper assembly 100 via the mentioned ventilation holes 170*a-b* of the hollow elongated body 140*a*.

By appropriate design of the mentioned ventilation holes 170*a-b* or by arranging controllable valves in connection with the mentioned ventilation holes 170*a-b*, the compensation of the interior volume is tuneable.

As for the accumulator 171, also the mentioned valve(s) may be arranged to a control unit, wherein the properties of the mentioned valve(s) may be adjusted manually or automated.

The latter solution will be suitable for less critical application, as this solution could face disadvantages related to fouling and other biological impurities (i.e. marine growth) in the viscous damper assembly 100.

Figure 6:
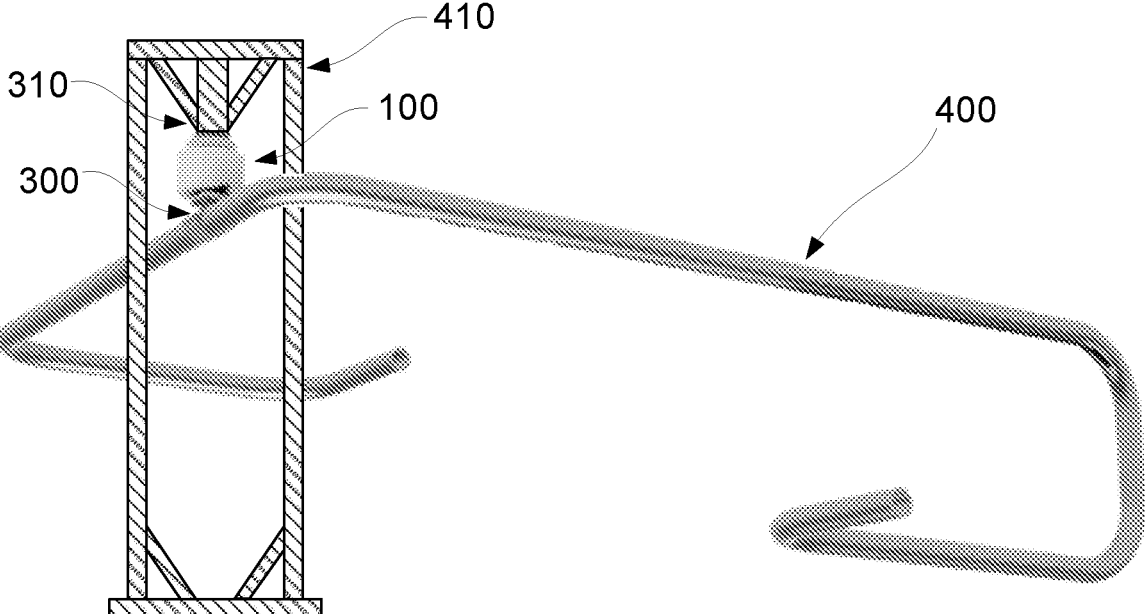
FIG. 6 is a principle drawing of a viscoelastic damper assembly according to the disclosure arranged to an object or structure to be damped.

Reference is now made to FIG. 6 showing a principle drawing of a viscoelastic damper assembly 100 arranged to an object or structure 400 to be damped. The viscoelastic damper assembly 100 is arranged to a moving or vibrating object or structure 400 by means of adapted attachment means 300 via the connection device 150 and to a stationary object or structure 410, such as a foundation, frame, fundament or base, by means of adapted attachment means 310 via at the connection device 120, or vice versa.

The prior art solutions make use of damping unit 140 that are formed as a hollow cylinder. It is advantageous to use hollow structures to avoid displacement of the viscous fluid in the housing 110. However, the use of a hollow cylinder gives a low drag coefficient and further gives no possibility to set individual damping properties for different degrees of freedom.

The efficiency of the viscoelastic damper assembly 100 will be defined by the drag coefficient of the at least one damping unit 140 in the viscous fluid.

The drag coefficient ca is defined as:

$$c_d = \frac{2F_d}{\rho u^2 A},$$

where:

$F_d$ is the drag force, defined as the force component in the direction of the flow velocity, $\rho$ is the mass density of the fluid, u is the flow speed of the objective relative the fluid, A is the reference area.

Figure 3:
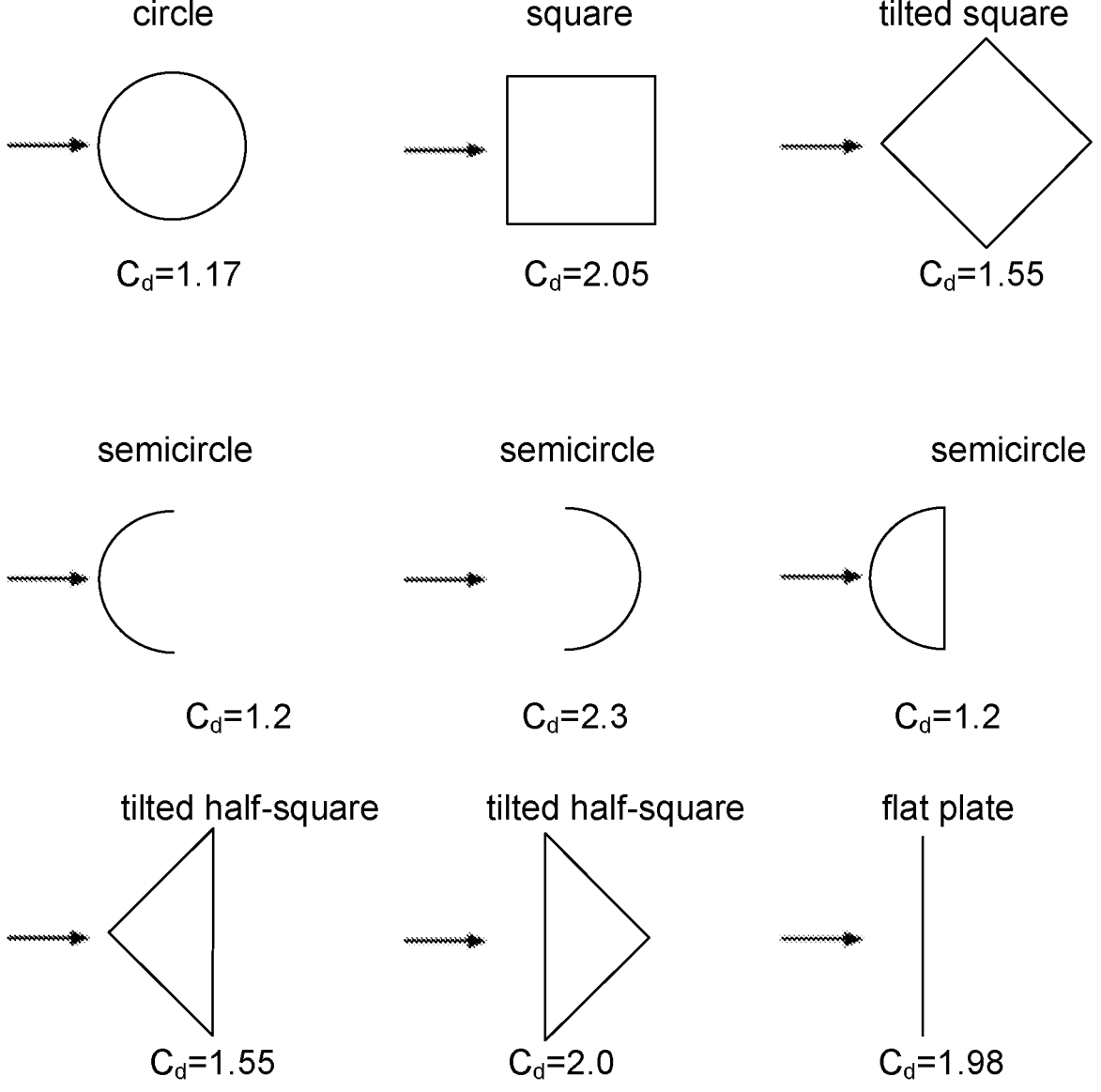
FIG. 3 shows principle drawings of cross-sectional shapes and their corresponding drag coefficient.

In FIG. 3 are shown examples of different (cross-sectional) shapes and their drag coefficient Ca. Prior art solutions make use of a rod or tube in the form of a hollow cylinder, i.e. a circle cross-section. As can been seen the drag coefficient will typically be approximately only the half of a plate-shaped structure.

Reference is now made to FIGS. 4A-4H showing examples of principle drawings of cross-sectional shapes of the damping device 140b of the at least one damping unit 140 of the viscoelastic damper assembly 100. The at least one damping unit 140 comprises at least one damping device 140a extending into the viscous fluid 130 and formed by at least one damping member 142, 142a-d with a desired geometric shape, in the example shown as plate-shaped structure(s) 142, 142a-d. The at least one damping member 142, 142a-d, shown as plate-shaped structure in the example, of the at least one damping device 140b is oriented in the viscous fluid 130 to achieve (set) individual damping properties for different degrees of freedom. The at least one damping member 142, 142a-d may have an extension in the vertical plane, in the horizontal plane or both. The at least one damping device 140a-b may comprise several damping members 142a-d, shown as plate-shaped structures in the example, arranged to each other or to a base structure 143. In embodiments where the damping device 140b comprises several damping members 142a-d, the damping members 142a-d may have same or different shape and size (length, width, thickness).

Figures 4A, 4B, 4C, 4D, 4E, 4F, 4G, 4H:
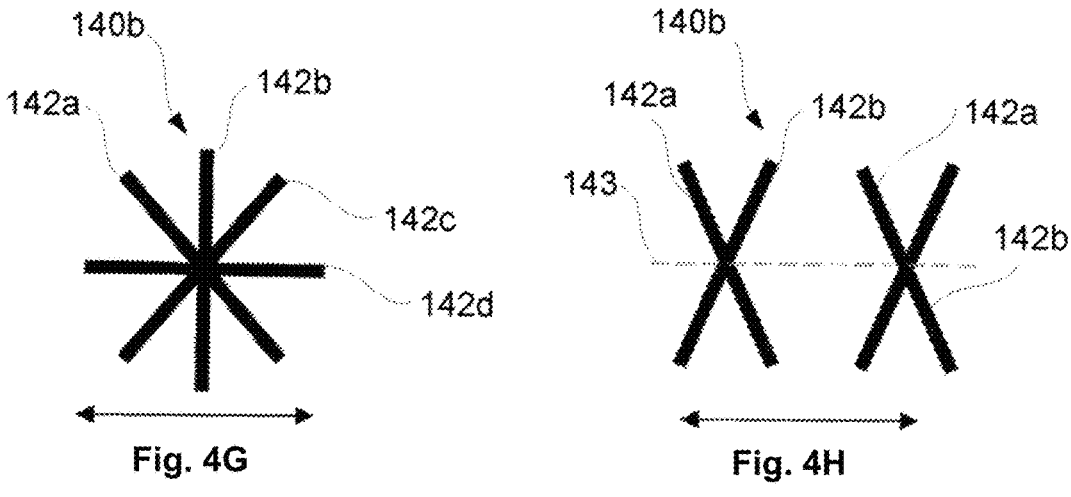
FIGS. 4A-4H are principle drawings of cross-sectional shapes of a damping device disclosed herein.

In FIG. 4A is shown an embodiment where the damping device 140b is formed by a single damping member 142, in the example a single plate, oriented with its longitudinal direction in the vertical plane or horizontal plane, depending on the direction of the movement to be damped. The damping member 142 may further be arranged with an angle in relation to the vertical and/or horizontal plane.

In FIG. 4B is shown an embodiment where the damping device 140b is formed by two damping members 142a-b, in the example two plates, arranged to each other extending in two different vertical planes, and in this manner form a damping device 140b that is X-shaped or cross-shaped. FIG. 4B is the cross-sectional view of the damping device 140b shown in FIGS. 1A-1D.

FIG. 4C shows an embodiment where the damping device 140b is formed by an elongated base structure 143, that preferably is hollow and exhibits a square, rectangular, elliptic, circular or other suitable cross-section, wherein the base structure 143 at exterior or interior surface thereof is provided with damping members 142a-d, in the example plate-shaped structures, extending in longitudinal direction of the elongated base structure 143 and arranged along the exterior or interior circumference of the base structure 143 to achieve a desired pattern. In the shown embodiment the damping members 142a-d are forming a pattern corresponding to the shape of an X or a cross, as in the embodiment of FIG. 4B.

In FIG. 4D is shown an embodiment where the damping device 140b is formed by two curved damping members 142a-b, in the example shown as two plate-shaped structures with a semi-circular cross-section, arranged together, wherein the curved plate-shaped structures 142a-b are arranged with the open side thereof facing away from each other.

In FIG. 4E is shown an embodiment where the damping device 140b is formed by four curved damping members 142a-d, in the example shown as plate-shaped structures, wherein each curved damping member 142a-d is arranged to ends of an adjoining curved damping member 142a-d, and in this way form a damping device 140b with a quadric cross-section and curved sides.

In FIG. 4F is shown an embodiment where the damping device 140b is formed by four damping members 142a-d, in the example shown as plate-shaped structures, arranged to a base structure 143 in the form of a rod, the damping member 142a-d arranged in series in longitudinal direction of base structure 143 with a distance therebetween, i.e. translated damping members, wherein the base structure 143 is arranged to the elongated body 140a.

In FIG. 4G is shown an embodiment where the damping device 140b is formed by four damping members 142a-d, in the example shown as plate-shaped structures, arranged to each other to form a rotated cross.

In FIG. 4H is shown an embodiment where the damping device 140b is formed by four damping members 142a-b, in the example shown as plate-shaped structures, wherein two and two damping members 142a-b are arranged to each other to form X-shaped or cross-shaped structures as in the embodiment of FIG. 4B, wherein the two X-shaped or cross-shaped structures are arranged to a base structure 143 with a distance therebetween, accordingly translated X or cross, wherein the base structure 143 is arranged to the elongated body 140a.

Accordingly, as shown in the few non-limiting examples above, the damping member(s) 142, 142a-d can be aligned horizontally or vertically, as well as the geometries may be repeated in a rotational or translational manner to form new structures for the damping device 140a-b.

The damping member(s) 142, 142a-d may further be provided with support components at first and/or second sides of the damping member (s) 142, 142a-d for structural strength of the damping device 140b.

Figure 5A:
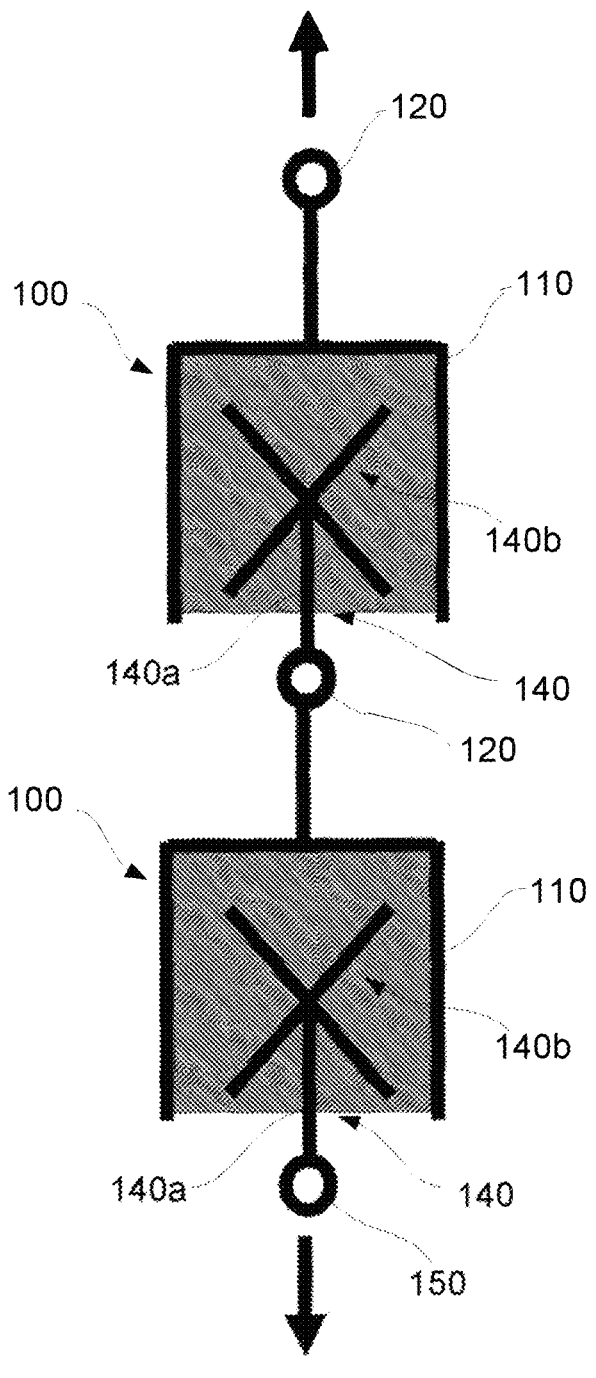
FIGS. 5A-5C are principle drawings of alternative embodiments of the damper assembly.
Figure 5B:
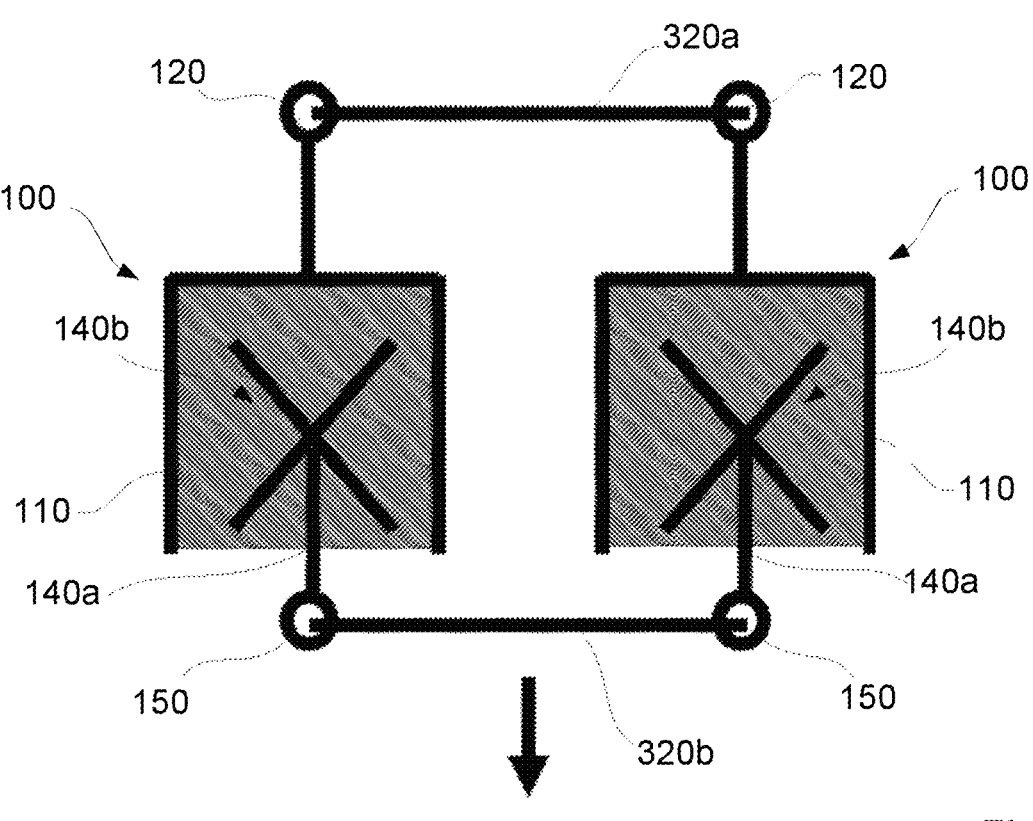
Figure 5C:
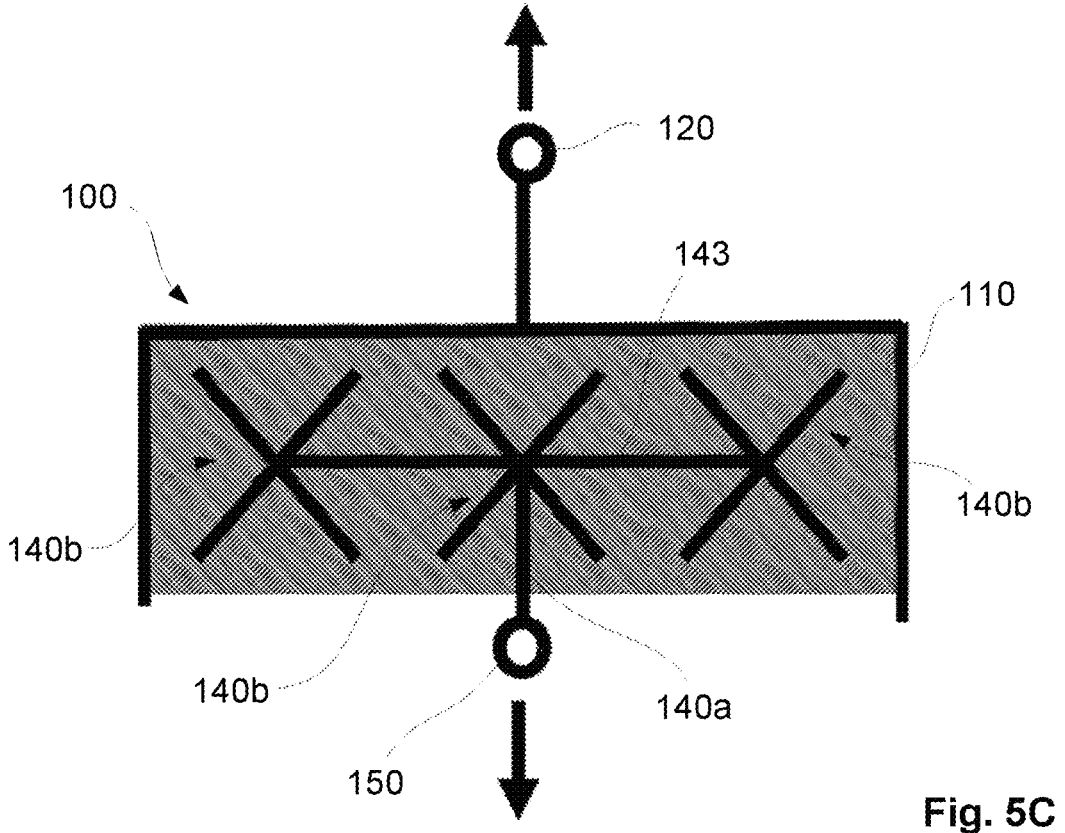

Reference is now made to FIGS. 5A-5C showing principle drawings of further embodiments of the disclosure, wherein some parts have been omitted for the sake of clarity. Only the part of the housing 110 containing the viscous fluid 130, at least one damping unit 140 and damping device 140b are shown in the FIGS. 5A-5C. Two or more viscoelastic damper assemblies 100 or damping devices 140b may be arranged in series or parallel. In FIG. 5A is shown an embodiment where two separate viscoelastic damper assemblies 100 are arranged in series by that a first viscoelastic damper assembly 100 is arranged to the object or structure 400 to be damped and a second viscoelastic damper assembly 100 is arranged to the first viscoelastic damper assembly 100 at the second side by that the damping unit 140 is arranged to the connection device 120 of the first viscoelastic damper assembly 100, and to a stationary object or structure 410 at the first side via the connection device 150. This will provide a total damping of $d_{tot}=d/2$.

In FIG. 5B is shown an embodiment where two separate viscoelastic damper assemblies 100 are arranged in parallel and connected to each other at both first and second sides by adapted common connection devices 320a-b, respectively, via their respective connection devices 120 and 150, wherein the first side is connected to the object or structure 400 to be damped and at the second side is connected to a stationary object or structure 410. This will provide a total damping of $d_{tot}=2*d$.

In FIG. 5C is shown a further embodiment where several damping devices 140b, in the example shown a number of three, are connected together in series via a base structure 143 in the horizontal plane in the same housing 110, and wherein one of the damping devices 140b is arranged to the elongated body 140a. This will provide a total damping of $d_{tot}=3*d$.

FIGS. 5A-5C show only a few non-limiting examples of how the principles of the disclosed embodiments may be combined to form different viscoelastic damper assemblies 100.

According to a further embodiment, two or more of the above described damping units 140 with damping devices 140b may be arranged in separately, in series or in parallel in the same housing 110.

The viscoelastic damper assembly 100 may be used both in air and in submerged applications.

Also provided is a viscoelastic damper assembly 100 that provides a higher drag coefficient than prior art solutions. This results in that the viscoelastic damper assembly 100 may be designed with less viscous fluid 130 to achieve the required damping effect, resulting in that the viscoelastic damper assembly 100 will become smaller in size and thus less space-demanding compared to prior art solutions. The viscoelastic damper assembly 100 will thus fit into smaller spaces compared to prior art solutions.

The fact that less viscous fluid 130 is required in the viscoelastic damper assembly 100 also results in that the inventive embodiments will be cheaper to manufacture and use than prior art solutions. The viscoelastic damper assembly 100 is stable over a larger temperature range, compared to prior art solutions, due to enabling the use of viscous fluids 130 that are stable over a larger temperature range, compared to prior art, due to increased damping may be achieved through geometry before viscosity, and thus less volume of the viscous fluid 130 is required.

The viscoelastic damper assembly 100 may be adjusted/set with different damping properties for different degrees of freedom (3×translation, 3×rotation) by the use of damping member (s) 142, 142a-d. The damping member(s) 142, 142a-d may accordingly be used to set individual damping properties in all degrees of freedom.

The disclosed embodiments also enable the use of viscoelastic damper assemblies 100 to be arranged in series or parallel, by arranging them to each other via adapted connection means, or by using several damping devices 140b in the same housing 110, resulting in a damping equal to n*d or d/n correspondingly, where n is the number of viscoelastic damper assemblies 100 or damping devices 140a-b.

In FIG. 6 is shown the arrangement of a viscoelastic damper assembly 100 between an object or structure 400 in the form of a piping that is to be added damping and a stationary object or structure 410. Several viscoelastic damper assemblies 100 with the same or different damping properties may be arranged to the same object or structure 400 for reduction of motion/vibration of the object or structure 400.

Even though the example description has been related to an embodiment wherein the housing 110 is arranged with the opening 111 downwards and wherein the immiscible filling fluid 131 has higher density and lower viscosity than the viscous fluid 130, it will be an alternative embodiment to arrange the housing 110 with the opening 111 upwards by using an immiscible filling fluid 131 having lower density and lower viscosity than the viscous fluid 130.

Alternatives to the use of plate-shaped structures for the damping member(s) are, but not limited to, solid or hollow square/polygonal structures.

The technical features of the described embodiments may be combined to form modified embodiments within the scope of the attached claims.

The invention claimed is:

1. A viscoelastic damper assembly (100) comprising:
a housing (110) provided with an opening (111) at a first end thereof and provided with a first connection device (120) at a second closed end thereof,
at least one damping unit (140) having a first end arranged to a second connection device (150) and a second end extending into the housing (110) via the opening (111),
a resilient sealing means (160) providing an airtight and watertight seal between the at least one damping unit (140) and the housing (110),
a compensation means (170a, 170b, 171) for compensating interior volume, wherein
the first and second connection devices (120, 150) connect the viscoelastic damper assembly (100) to a stationary object or structure (410) at one side and to an object or structure (400) to be damped at another side,
a viscous fluid (130) is accommodated in the housing (110),
the housing (110) is partly filled with the viscous fluid (130) and partly filled with an immiscible filling fluid (131),
the at least one damping unit (140) extends at least partly into the viscous fluid (130),
the at least one damping unit (140) is formed by an elongated body (140a) and at least one damping device (140b) comprising at least two damping members (142a-142d),
the at least two damping members (142a, 142b) are arranged to each other or to a base structure (143),
the at least two damping members (142a-142d) are aligned horizontally or vertically,
geometries of the at least two damping members (142a-142d) are repeated in a rotational or translational manner, and
the housing (110) is arranged with the opening (111) downwards and wherein the immiscible filling fluid (131) has higher density and lower viscosity than the viscous fluid (130).

2. The viscoelastic damper assembly (100) according to claim 1, wherein
the elongated body (140a) is hollow and the compensation means (170a, 170b, 171) comprises ventilation holes (170a, 170b) in the elongated body (140a),
at least one ventilation hole (170a) is arranged in a part of the elongated body (140a) positioned inside the housing (110), and
at least one ventilation hole (170b) is arranged in a part of the elongated body (140a) positioned outside the housing (110).

3. The viscoelastic damper assembly (100) according to claim 2, wherein the compensation means comprises at least one accumulator (171) connected to the at least one venti-lation hole (170*b*) in the elongated body (140*a*) positioned outside the housing (110).

4. The viscoelastic damper assembly (100) according to claim 2, wherein the ventilation holes (170*a*, 170*b*) are open to surrounding fluid.

5. The viscoelastic damper assembly (100) according to claim 1, wherein the at least one of the at least two damping members (142*a*-142*d*) is oriented in the viscous fluid (130) to set individual damping properties for different degrees of freedom.

6. The viscoelastic damper assembly (100) according to claim 1, comprising at least two damping devices (140*b*) arranged in parallel or series in the same housing (110).

7. The viscoelastic damper assembly (100) according to claim 1, wherein the at least one of the at least two damping members (142*a*-142*d*) has a plate-shaped structure.

8. The viscoelastic damper assembly (100) according to claim 1, wherein the at least two damping members (142*a*-142*d*) have the same or differ in one or more of shape, length, width and thickness.

9. The viscoelastic damper assembly (100) according to claim 1, wherein one or more of the at least two dampening members (142*a*-142*d*) has an extension in one or both of a vertical plane and a horizontal plane.

10. A viscoelastic damper assembly (100) system, comprising:
two or more viscoelastic damper assemblies (100) according to claim 1 arranged in series or parallel.

11. A viscoelastic damper assembly (100) comprising:
a housing (110) provided with an opening (111) at a first end thereof and provided with a first connection device (120) at a second closed end thereof,
at least one damping unit (140) having a first end arranged to a second connection device (150) and a second end extending into the housing (110) via the opening (111),
a resilient sealing means (160) providing an airtight and watertight seal between the at least one damping unit (140) and the housing (110),
a compensation means (170*a*, 170*b*, 171) for compensating interior volume, wherein
the first and second connection devices (120, 150) connect the viscoelastic damper assembly (100) to a stationary object or structure (410) at one side and to an object or structure (400) to be damped at another side,
a viscous fluid (130) is accommodated in the housing (110),
the housing (110) is partly filled with the viscous fluid (130) and partly filled with an immiscible filling fluid (131),
the at least one damping unit (140) extends at least partly into the viscous fluid (130), the at least one damping unit (140) is formed by an elongated body (140*a*) and at least one damping device (140*b*) comprising at least two damping members (142*a*-142*d*),
the at least two damping members (142*a*, 142*b*) are arranged to each other or to a base structure (143),
the at least two damping members (142*a*-142*d*) are aligned horizontally or vertically,
geometries of the at least two damping members (142*a*-142*d*) are repeated in a rotational or translational manner, and
the housing (110) is arranged with the opening (111) upwards and wherein the immiscible filling fluid (131) has lower density and lower viscosity than the viscous fluid (130).

12. The viscoelastic damper assembly (100) according to claim 11, wherein the at least two damping members (142*a*-142*d*) have the same or differ in one or more of shape, length, width and thickness.

13. The viscoelastic damper assembly (100) according to claim 12, wherein the compensation means comprises at least one accumulator (171) connected to the at least one ventilation hole (170*b*) in the elongated body (140*a*) positioned outside the housing (110).

14. The viscoelastic damper assembly (100) according to claim 12, wherein the ventilation holes (170*a*, 170*b*) are open to surrounding fluid.

15. The viscoelastic damper assembly (100) according to claim 11, wherein one or more of the at least two dampening members (142*a*-142*d*) has an extension in one or both of a vertical plane and a horizontal plane.

16. The viscoelastic damper assembly (100) according to claim 11, wherein
the elongated body (140*a*) is hollow and the compensation means (170*a*, 170*b*, 171) comprises ventilation holes (170*a*, 170*b*) in the elongated body (140*a*),
at least one ventilation hole (170*a*) is arranged in a part of the elongated body (140*a*) positioned inside the housing (110), and
at least one ventilation hole (170*b*) is arranged in a part of the elongated body (140*a*) positioned outside the housing (110).

17. The viscoelastic damper assembly (100) according to claim 11, wherein at least one of the at least two damping members (142*a*-142*d*) is oriented in the viscous fluid (130) to set individual damping properties for different degrees of freedom.

18. The viscoelastic damper assembly (100) according to claim 11, comprising at least two damping devices (140*b*) arranged in parallel or series in the same housing (110).

19. The viscoelastic damper assembly (100) according to claim 11, wherein at least one of the at least two damping members (142*a*-142*d*) has a plate-shaped structure.

\* \* \* \* \*